United States Patent [19]

Margerie

[11] 4,275,110
[45] Jun. 23, 1981

[54] SELF-SUPPORTING BUILDING ELEMENTS AND METHOD OF MANUFACTURE

[76] Inventor: Gilbert C. A. Margerie, 65, av. de la Motte Picquet, Paris, France, F-75015

[21] Appl. No.: 26,327

[22] Filed: Apr. 2, 1979

Related U.S. Application Data

[62] Division of Ser. No. 740,912, Nov. 11, 1976, abandoned.

[30] Foreign Application Priority Data

Nov. 11, 1975 [CH] Switzerland .................... 14702/75

[51] Int. Cl.³ .................. E04C 2/04; B32B 5/18; B32B 13/00
[52] U.S. Cl. .................. 428/305; 264/71; 264/256; 428/310; 428/321; 428/447; 428/448; 428/701; 428/703
[58] Field of Search .................. 106/90, 97, 98; 252/62; 428/212, 217, 218, 310, 321, 323, 328, 329, 330, 331, 402, 405, 407, 447, 305, 538, 539; 427/221; 264/71, 102, 256, DIG. 57

[56] References Cited

U.S. PATENT DOCUMENTS

| | | | |
|---|---|---|---|
| 698,542 | 4/1902 | Norcross | 264/DIG. 57 |
| 1,541,165 | 6/1925 | Minache | 264/DIG. 57 |
| 1,983,021 | 12/1934 | Eaton | 264/DIG. 57 |
| 2,079,664 | 5/1937 | Seigle | 264/DIG. 57 |
| 2,305,684 | 12/1942 | Foster | 264/DIG. 57 |
| 2,524,419 | 10/1950 | Billner | 264/102 |
| 2,839,812 | 6/1958 | Berliner | 264/256 |
| 3,147,177 | 9/1964 | Owens et al. | 428/310 |
| 3,318,839 | 5/1967 | Weissbach | 260/37 SB |
| 3,753,849 | 8/1973 | Duff | 428/446 |
| 3,875,278 | 4/1975 | Brandt | 264/102 |
| 4,053,677 | 10/1977 | Corso | 428/310 |
| 4,113,913 | 9/1978 | Smiley | 428/310 |

FOREIGN PATENT DOCUMENTS

2023609 12/1971 Fed. Rep. of Germany .......... 428/310

*Primary Examiner*—William J. Van Balen
*Attorney, Agent, or Firm*—Saul Jecies

[57] ABSTRACT

The invention concerns a compact, self-supporting element consisting of varying layers having a strong mechanical resistance, as well as being watertight and thermetically and acoustically insulated. The element is especially, although not exclusively, suited to coverings, walls, partitions and other constituent parts of buildings.

The invention also concerns the special way of obtaining panel materials and the possible different structures that can be made therefrom.

17 Claims, 3 Drawing Figures

SELF-SUPPORTING BUILDING ELEMENTS AND METHOD OF MANUFACTURE

This is a division of my copending application Ser. No. 740,912, filed Nov. 11, 1976, now abandoned.

BACKGROUND OF THE INVENTION

Numerous tests have been carried out in the building industry in order to break away from the traditional construction methods, especially on account of the price of materials and the high cost of specialized labor. For roofings, research has been made to eliminate heavy timber by using light, but strong, covering materials; for walls and partitions, conventional construction by means of piling up materials such as stones, bricks, parpen, etc., is substituted by the use of prefabricated story-high panels.

The problem of making self-supporting panels, with enough heat and acoustical insulation as well as being sufficiently watertight to resist vapors and rain, is not at all easy to solve. They must be very light as well as easy to handle in order to be mounted onto the construction frame.

Self-supporting panels have already been manufactured with a heterogeneous structure made of plaques, formed by elements of processed wood, in molded material, with internal air holes or filled with different thermetically insulating materials. Wall-building material which is not sufficiently hard can easily become damaged during transport to the building site. The assembling of such panels by such different fixing means as nailing, sticking or otherwise, can disarticulate the panels under normal efforts applied to walls and coverings, especially due to the effect of violent wind.

The approximate weight of 20 kgs/m² sought after for closed premises corresponds approximately to the minimum upthrust effort foreseen, taking into consideration snow and wind.

The impregnation products which protect against dampness are moreover often useless.

It is an object of this invention to overcome the drawbacks of the prior art and to provide building elements which are not only sufficiently light and strong in order to be easily transported to the building site, but which, once on the spot, are highly resistant to powerful outside effects.

The invention also concerns the manufacture of panels which, thanks to their strength and light weight, as well as their anti-freeze, incorruptible, fire-proof structure, can be used as covering material with well-spaced-out timber purlins without rafters, battens or scantlings.

Another object of this invention is to supply a panel which is highly insulated both thermatically and acoustically.

There is also the possibility of molding and coloring the material during manufacture in order to give it a special aspect, such as imitation baked clay tiles, slate, lauzes, shingle-boards of splintered wood, etc., for the outside or decoration in relief for the inside. Moreover, shafts or pipes may be incorporated during manufacture allowing the passage of electric conduits and different fluids.

The grounds of the invention lay essentially on experience according to which concrete, made up of light aggregate, such as perlites, i.e., siliceous materials in nodules, originally volcanic, can be made stronger than usual, if it is bound by resin and silanes or silanols, which increase considerably the cohesion of the material, and reinforce by chemical bridging elements the binding material and the loads. But, for use in large surfaces of light aggregate concrete, the manufacturing processes must be respected in order to obtain a higher mechanical resistance. One of the following three formulas can be chosen.

1. The light aggregate could be impregnated with water added to the resin and silane about 24 hours before mixing with the rest of the components.

2. The light aggregate could be impregnated, about 24 hours before mixing with the rest of the components, with water and a percentage of resin and silane determined by the type of light aggregate chosen, the rest of the resin and silanes to be added when mixing takes place.

3. The light aggregate could be impregnated, about 24 hours before mixing, with water containing an inhibitory charge (quaternary ammonium kind). In this case, the resin and silanes are added to the components when mixing takes place.

As used herein, silanes = organic silicate whose radical R is compatible with the resin used, and SI free gives SIO—OH in the presence of $H_2O$ in order to assure the liaison.

SILANOLS or SILANES

R = Radical alkyl or aryl
R'—Si (OR)$_3$
1. Adhesive promoter
2. The silicones are neither polar to the polymerics nor anti-adhesive and oily reagents.

The silanols are monomerics containing reactive groups.

| $NH^2$ or $CH^2$ Organic liaisons | $Si(OOH_3)_3$ Hydrolysible function reduction |
|---|---|
| 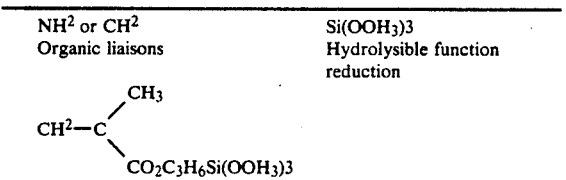 | |

3. The hydrolysible groups can react with the hydroxyls on inorganic surfaces

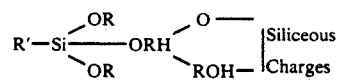

The liaison is thus formed between all the surfaces.

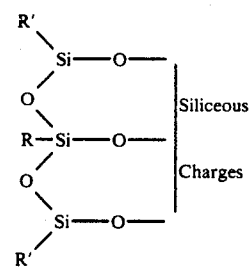

Thus the liaison between a surface and reactive resin:

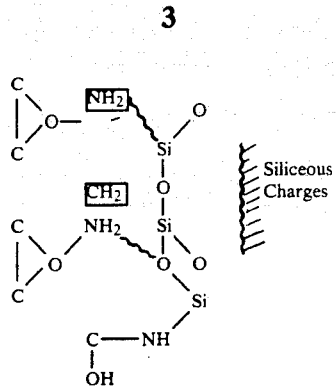

These processes in fact allow the total coating of the aggregate by the resin and hydraulic binding material, the result being the insulation or cancellation of the repellant electromagnetic charges concentrated in the points of the aggregate, and the chemical liaison, in particular with the siliceous charges, above all when water is present, thus obtaining a much higher mechanical resistance of the concrete.

Moreover, the vibration method of the whole, binding hydraulics—resins—silanes, light and heavy aggregates, allows variation, in the material, the local density of certain layers as well as its impermeability. There is thus an extremely supple way of obtaining the different qualities required in a construction material, as long as these materials are not only bearers, but must resist bad weather and variable coercions.

SUMMARY OF THE INVENTION

In a compact self-supporting element with varying layers according to the invention, at least one outside layer intended to be subject to pulling and pushing, consists of concrete obtained by the mixing and solidification of a hydraulic binding material, consisting preferably of cement, with light aggregates, prehydrated or pre-plastered, (perlite, pumice-stone or similar) heavy aggregates for the pigmentation (crushed schists, baked clay, etc.) and resins in emulsion or dispersion, silanes, the cement grout loaded with resins and silanes, during molding, having become more dense on the side of the layer which must be impervious to water and/or to vapors.

Coloring and/or reinforcement can be incorporated in the mixture. A decorative imprint can also be foreseen during the molding on the side of the element where the density is strongest.

According to a preferable form of the invention, a panel comprises two outside layers corresponding to the external faces of a wall or of a covering plaque of a building, the said layers being separated by a cellular central layer, less dense than the outside layers.

The invention also includes a process of obtaining a self-supporting element consisting of at least one layer of concrete which could resist a pushing force of approximately 30 kgs/cm$^2$ and more, and according to which a hydraulic binding material is mixed with light aggregates, prehydrated or pre-plastered, such as silico-carbonate or silico-aluminate or silica-fossilized clay in nodules, i.e., large surface siliceous materials, the mixture then being worked and compressed with the removal of gas, in such a way as to assure suitable close moistening and homogeneity.

DETAILED DESCRIPTION OF PREFERRED EMBODIMENTS

Figure 1:
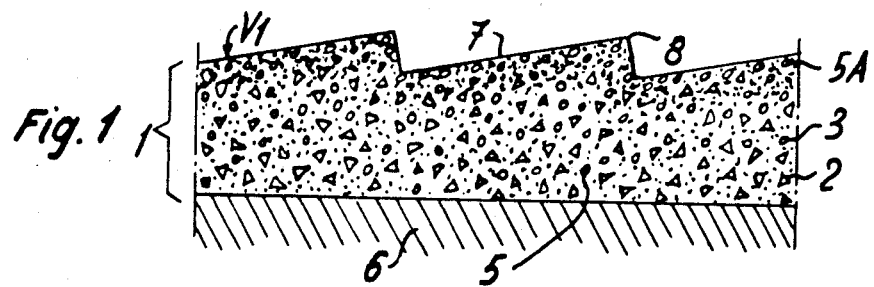
FIG. 1 represents a cross-section of a layer of a heterogeneous covering panel on the outside of a building.
Figure 2:
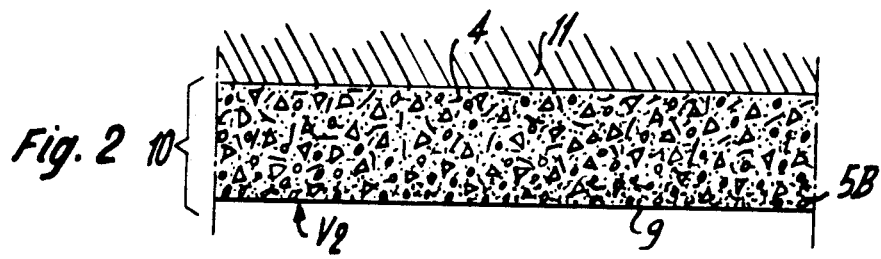
FIG. 2 represents the cross-section of the external layer of a heterogeneous covering panel on the inside of a building.

FIGS. 1 and 2 are intended to explain the essential features of the invention. The material 1 is concrete whose manufacturing process will be described hereafter. It consists of light mineral siliceous aggregates 2 of volcanic origin, for example, perlite, pumice-stone, pozzolana, charges consisting of heavy aggregates which can be colored particles and to which are added fiber reinforcements 4 of rock wool, bound together with a mixture of hydraulic binding material and resins in emulsion or dispersion with silanes. These resins and silanes 5, either their mixture or their copolymerics, can be of different chemical natures: polyvynil acetate, acrylic resin, butadiene styrene carboxymethyle cellulose or copolymerics of these resins.

These silanes play a very important role with respect to the nature of the light aggregate chosen. These latter, due to their volcanic origin, are light nodules and have distorted forms. The incorporation of the resin with silanes improves the power of liaison of the light aggregates with the hydraulic binding material, for the resins and silanes play a bridging role, isolating the aggregate and cancelling the effect of the repellent electrostatic charges accumulated in the points of the aggregate. The result is a considerably increased mechanical resistance. Thus ordinary concrete with light aggregates of equal density, has a compression resistance between 15 and 20 kgs. per square centimeter whereas the concrete of aggregates bound by resin with silanes attains 30 to 50 kgs. per square centimeter.

The result of the examination of FIG. 1 is that the resin with silanes, represented by spots 5, is not very dense on the side of the internal layer 6 of a panel, and that it is very dense towards the exterior 7 which must stand up to bad weather and various coercions. It will be seen subsequently that this difference of density is obtained by vibrations during casting, and if necessary by casting successive layers, either with variable proportions of resin and silanes, or light concrete.

In particular, it is possible to vibrate, either the cover presser, or the bottom of a mold in such a way as to attract the grout, loaded with resin with silanes, towards the side where it must be more dense. Thus, on FIG. 1, the region 5A vibrated in the direction V1, consists of a hydraulic binding material with a large density of resin with silanes, which results in water and vapor-proofing, as well as a greater mechanical resistance. Moreover, the mold can be foreseen with an imprint for a decorative relief 8. As will be seen later, the resin with silanes of material 1 also serves as a liaison for sticking under pressure between the whole of the layer which has just been described and a heterogeneous layer 6 placed below.

The same dispositions apply for a layer of a panel represented on FIG. 2, but the opposite applies for FIG. 1. By vibration in the direction V2 coming from below, the inferior limit 9 of the material was made more dense, the whole is shown by 10.

This layer in FIG. 2 can represent a finished covering or a facing stuck by pressure to a constituent part 11. In building, this layer 10 of FIG. 2 can be replaced by a material made up of plaques: silico-calcareous, laminated plastic type "POLYREY, FORMICA, etc.", wood, laminated or not, steel, aluminum, iron, zinc or other metals with or without a finished surface, for technical reasons as well as for aesthetic or decorative reasons.

Figure 3:
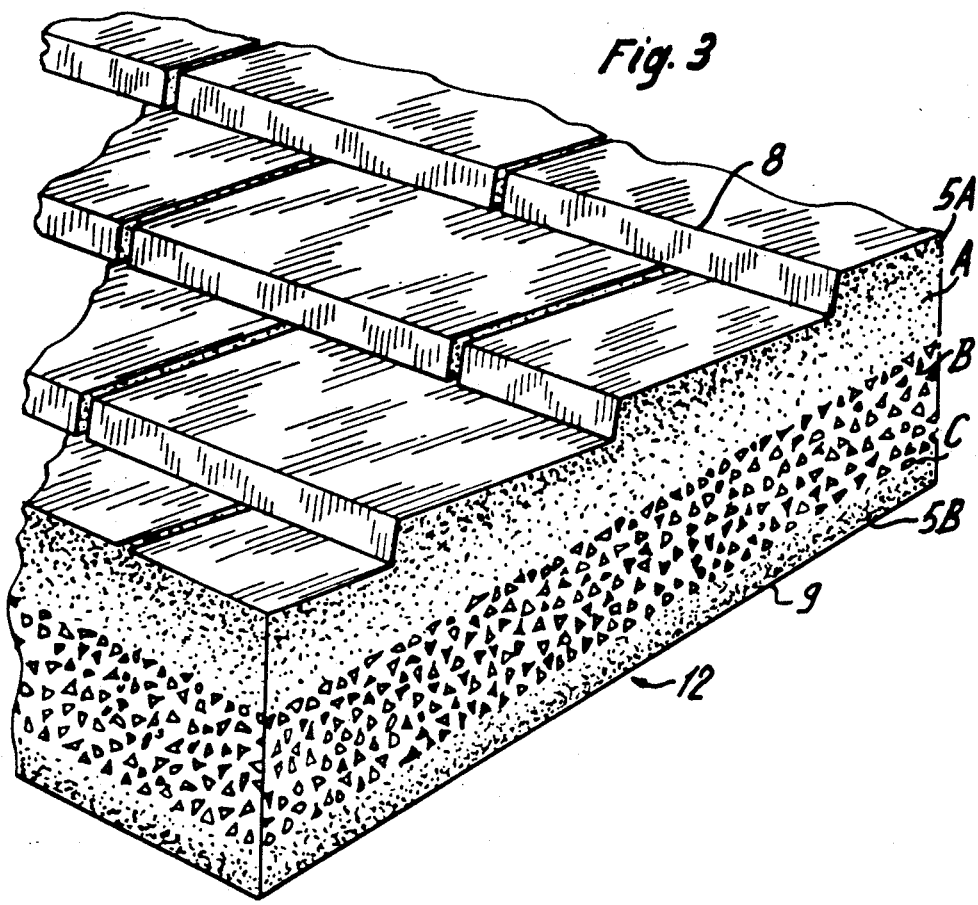
FIG. 3 is a perspective and cross-sectional view of a fragment of homogeneous panel, on the inside of a building.

FIG. 3 shows the construction of a covering panel (homogeneous components) made with the material already described and which is obtained by processes which differentiate the densities.

A covering panel, the whole shown by 12, includes, according to its cross-section: a decorative relief 8 resembling tiles, slates or all other reliefs or simply planes and marking the boundaries of the superior layer A which is the compression table of the panel 12; a middle layer of inferior density B composing the neutral plane of the panel; an inferior layer C forming a traction table of the panel 12. It is not necessary for the composition of the material of layer B to be the same as layers A and C respectively, the important point being to obtain a compact construction with variable density for layers A and C, as is explained with reference to FIGS. 1 and 2, while the middle layer is a bad heat conductor, whether or not it contains resin and silanes with light aggregates. Another advantage of constructions obtained according to FIGS. 1, 2 and 3 is phonic insulation due to density differences of the layers for homogeneous manufacture, or due to continuity and density ruptures in heterogeneous manufacture.

According to the invention, here are examples of panel composition:

| 1st example (heterogeneous manufacture) | |
| --- | --- |
| Compression table (A) | Traction table (C) |
| Perlite 120 | 137 |
| Cement 500 | 400 |
| Silane 0,5 | 0,4 |
| $CACL^2$ 10 | 9 |
| Resin 5000 M 42 | 40 |
| Colored charges 14 | —0— |
| Water 150 | 140 |
| Short rock wool fiber —0— | 15 |

The composition is shown in kgs. per $m^3$.

Layer B is composed of a plaque 4 cm. thick in phenolic resin foam known under the trade name of "PHENEXPAN".

| 2nd example (homogeneous composition manufacture) | | |
| --- | --- | --- |
| Compression table (A) | Neutral (B) | Traction table (C) |
| Perlite 140 | 133 | 137 |
| Cement 500 | 300 | 400 |
| Silane 0,5 | 0,3 | 0,4 |
| $CACL^2$ 10 | 6 | 9 |
| Resin 5000 M 42 | 35 | 40 |
| Colored charges 14 | 0 | 0 |
| Water 150 | 130 | 140 |
| Short rock wool fiber 0 | 0 | 5 |

The composition is shown in kgs. per $m^3$.

The three layers are composed of the same material with different densities.

In the two afore-mentioned examples the perlite is a feldspath of volcanic origin, and the resin 5000 M is a vinylic copolymer.

The result of the preceding is that the examination itself of the construction and of the composition of the elements represented according to FIGS. 1, 2, 3 shows that these are new products offering the qualities enumerated above, no matter what the form in other respects, the outlines, the decoration or the way of using these elements. The same material and the same density variations allow the production of, for example, special construction elements such as: corner-rafters, valley channels, edgings, genoises, plaster-filled-joints, etc. In the same way all sorts of plaques, shafts, or different elements could be manufactured for which the same features would be necessary.

The following are the special ways of obtaining panels of equal form or similar to the form in FIG. 3.

There are two manufacturing methods:

For each of these two manufacturing methods, the three preparations mentioned previously on page 4 can be applied.

Method 1.

The mixing of the cement and coloring(s) with certain aggregates pigmented or not, is carried out first, dry, in a drum, the mixture thus obtained is then mixed with the rest of the ingredients.

Method 2.

The cement and the pigmented aggregates are mixed with part of the water in a drum, the mixture thus obtained is then mixed with the rest of the ingredients.

The time for carrying out the above two methods varies according to the means used.

A simple mixing will need sensitive vibration twice as long for the evacuation of the occluded air than if the mixing was followed first by homogenisation by screwing, followed by an extraction of the gas in an expansion chamber, lastly a new compression by a second screw.

Casting the panels:

The three elements ABC composing the panel, can be put into place by one of several methods:

Method 1:

The concrete of the traction table (layer C) is cast in the bottom of the mold in two successive castings for incorporating the reinforcement of glass wool or metal, it is then pressed or pressed and vibrated above or below according to the chosen density of the aggregates in order to make the usury and pigmented layer more dense towards the bottom and around the chosen reinforcement.

The cellular layer B (light or expanded concrete) is put into place and pressed.

The concrete of the compression table (layer A) is cast on the cellular layer, then pressed and vibrated simultaneously in order to make the grout loaded with resins move again towards the usury layer exposed to bad weather. The decorative imprint of the compression table is placed on the vibrating press which has just been applied above the mold.

In this way, the whole panel is finally composed in the mold.

Method 2:

The concrete of the compression table is cast in the bottom of the mold which contains the decorative imprint, the concrete is compressed and then vibrated by the bottom of the mold in order to attract the grout of the hydraulic binding material loaded with resins and silanes of heavy aggregates, thus giving a stronger denity to the usury face bearing the chosen relief. It must be completely set before the plaque thus obtained can be withdrawn from the mold.

Moreover, a cellular insulating plaque (expanded polystyrene, formol-phenolic, etc.) with the dimensions of the mold of the compression table is coated with a thin layer of concrete, colored or not. The rock fiber, synthetic or metallic reinforcement, is set on this first coating; a second coating layer is then applied in order to countersink the reinforcement and make the finishing layer. This double coating is pressed and vibrated, the resins and silanes contained in the concrete assuring the sticking with the insulating cellular plaque.

The concrete must then be allowed to set.

The slab composing the compression table which has been withdrawn from the mold is then pasted with resin on the face opposite that with the decorative imprint and the cellular insulation bearing the traction table is applied there, the insulation itself having been pasted with resin before hand. These two parts together are then pressed for perfect adherence of the compression table to the cellular layer.

Regarding the immediately preceding two methods, a decorative imprint corresponding to interior ornamentation can of course be foreseen on the side of the traction table. From the two methods a finished panel is obtained bearing on one or both faces the desired imprint. In the two methods, the layer C (traction table) can be replaced by a material of prefabricated plaques offering equivalent mechanicl properties, for example: silico-limestone, laminated plastic type "POLYREY", "FORMICA" or others, laminated or not wood, steel, iron, aluminum, zinc or other metals.

The withdrawal from the mold of the panel(s) elements could be carried ot from 1½ to 4 hours, according to whether the setting of the hydraulic binding material is accelerated either by passing it through a drying-room or by the incorporation in the concrete of a setting accelerator. The vibration of the compression and traction tables is predetermined depending on the results to be obtained: a lapse of time of 30 to 40 seconds allows either the displacing of part of the components contained in the concrete towards the exterior faces in order to reinforce the hardness and water-proofness as far as the compression table is concerned, or the forming of imperviousness to water and vapor, as far as the traction table is concerned.

It will be apparent that any particular manufacturing process could be adapted, taking pattern from the above-mentioned principles for the manufacture of special building elements which were discussed previously. In the case of, for example, the manufacture of partitions or filling-in panels, one or other of the exterior faces of the panel will be indifferently compression table or traction table according to the constraints which are applied to the panel.

What is claimed is:

1. The method of making a discrete concrete construction element having layers of different densities having improved compression resistance in excess of 30 Kg/cm$^2$, comprising the steps of mixing water with a light aggregate and hydraulic binding cement material to form a light weight but dense first cement mixture;

pouring said first cement mixture into a casting form;

mixing water with other aggregate and hydraulic binding cement material to form a second cement mixture of lesser density;

pouring said second cement mixture into said casting form over said first cement mixture;

mixing water with light aggregate and hydraulic binding cement material to form a light weight but dense third cement mixture;

including the intermediate step of adding a resin and a silane to at least one of said light aggregate feed materials to improve adhesion between said mixtures;

pouring said third cement mixture into said casting form over said second cement mixture;

treating said mixtures to obtain migration of particles of the mixture to one surface to densify the same and render said surface impervious to water and vapor;

and removing the resulting construction element from said casting form after said element has sufficiently set.

2. A method of making a discrete concrete construction element as claimed in claim 1 wherein said treatments include the step of subjecting the mixtures to vibration in said form to obtain intermingling of the interfaces of said mixtures.

3. A method of making a discrete concrete construction element as claimed in claim 1 wherein said treatment includes the step of evacuating the occluded air by the steps of effecting preliminary mixing of each cement mixture and placing then these mixtures into an expansion chamber, and thereafter completing the mixing of said respective cement mixture, until at least one surface of the element is rendered water and vapor impervious.

4. A method as defined in claim 1 wherein at least one outside layer has been degassed or densified by vibration, to make it impervious to water and vapor.

5. A method according to claim 1 wherein, in order to obtain improved chemical bonding between said light aggregate and the said binding material, said light aggregate are prehydrated by wetting them with a water based solution of resin and silane.

6. A method as claimed in claim 1 wherein said light aggregates are preplastered to obtain improved chemical bonding between said light aggregate and the said binding material.

7. A discrete concrete construction element having layers of different densities, at least one outside layer comprising an hydraulic binding material and light aggregates, wherein a resin and a silane are present in the binding material.

8. A construction element according to claim 7 which in water and vapor impervious.

9. A construction element according to claim 7 wherein the interfaces between the layers are intermingled.

10. A construction element according to claim 7 comprising a decorate imprint.

11. A concrete construction element as claimed in claim 7 which is acoustically insulated.

12. A concrete construction element as claimed in claim 7, having a compression resistance attaining 30 kg/cm$^2$ to 50 kg/cm$^2$.

13. A concrete construction element as defined in claim 8 wherein said outside layer has been rendered impervious to water and vapor by mechanical steps.

14. A heavy load bearing concrete construction panel according to claim 7 comprising a water based cement layer of light aggregates and another layer of water based hydraulic binder material having high density and being of light weight; one layer being rendered impervious to water and vapors and where said light aggregates contain resin and silanes.

15. A heavy supporting discrete concrete construction element according to claim 7 having two dense but lightweight outside layers comprising light aggregates, resin, silane and waterbased cement hydraulic binder material, a cellular central layer of lesser density located between said outside layers whereby the resulting construction element is of light weight and has a compression resistance in excess of 30 kg/cm$^2$.

16. A discrete concrete construction element according to claim 15 comprising reinforcing elements embedded in at least one of said outside layers.

17. A concrete construction element as defined in claim 16, wherein said reinforcing elements comprise synthetic fibers.

* * * * *